Sept. 22, 1931.  W. VAN B. ROBERTS  1,824,572
ILLUMINATING SYSTEM FOR REGULATING TRAFFIC
Filed March 30, 1929
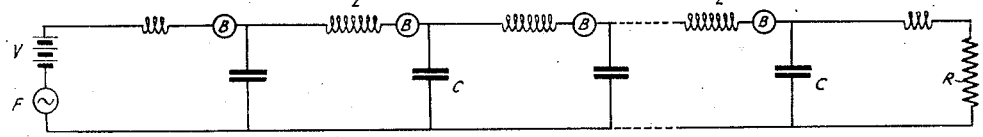
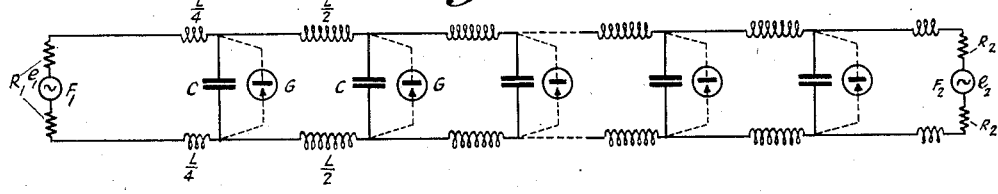
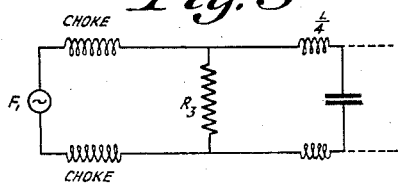
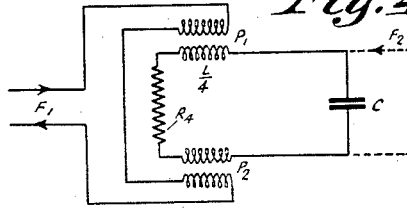
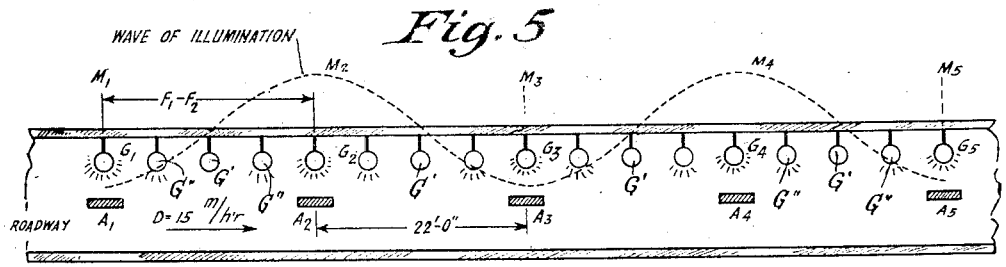
Inventor
WALTER VAN B. ROBERTS
By his Attorney Patented Sept. 22, 1931

1,824,572

UNITED STATES PATENT OFFICE

WALTER VAN B. ROBERTS, OF PRINCETON, NEW JERSEY, ASSIGNOR TO RADIO CORPORATION OF AMERICA, A CORPORATION OF DELAWARE

ILLUMINATING SYSTEM FOR REGULATING TRAFFIC

Application filed March 30, 1929. Serial No. 351,409.

My present invention relates to illuminating systems, and, more particularly, to a system for regulating vehicular traffic by guiding waves of illumination travelling along electric transmission lines.

When it is desired to maintain the maximum flow of traffic, consistent with safety, through a tunnel it is important to provide means for maintaining the same speed for all vehicles, and also for maintaining constancy of separation between vehicles. As speedometers vary among different vehicles, it is not sufficient merely to prescribe a given speed, since the spacing would be irregular if left to the operators of the vehicles, even crediting them with the best of intentions.

It would be of great assistance in maintaining the aforesaid constancy of speed and separation if a row of electric lights were provided parallel to the tunnel road, along which row waves of illumination travelled at the desired speed, and with the distance between points of maximum brightness equal to the separation desired between vehicles. With such a device in operation, each driver would need only to keep abreast of a wave of illumination; he would then be travelling at the same speed as all other vehicles, and the separation between vehicles could never become less than one "wave length" of the illumination waves.

Now, I have discovered a novel method of, and devised means for, producing slow moving waves of illumination along electric transmission lines, in this case preferably for regulating the movement of vehicular traffic in tunnels, which involves the generation and transmission of a current of a given frequency through a conducting line including electrical illuminating means, periodically neutralizing the current so that illumination occurs at a predetermined frequency, and, finally, so designing the conducting line that waves of illumination are formed which travel along the route to be regulated at a predetermined speed.

Accordingly, it is one of the main objects of my present invention to provide a system for generating and transmitting waves of illumination along a conducting line at a predetermined rate of travel, and to employ the distance and time intervals between waves for guiding purposes.

Another important object is to provide a system for guiding vehicular traffic along a roadway in such a manner that vehicles are spaced a constant distance apart and travel at the same speed, which consists in generating waves of illumination at a frequency equal to the vehicle speed desired, and then causing each vehicle to guide its travel along the roadway in accordance with the movement of the waves of illumination.

Still another important object of the invention is to provide a method of transmitting waves of illumination along a conducting line at a predetermined frequency, which consists in designing and proportioning the electrical characteristics of the line in such a manner that the said illumination waves may be made to move as slowly as desired, while the waves of current and voltage along the line are moving at a very high rate of speed whereby the values of the said characteristics do not become unwieldy.

The novel features which I believe to be characteristic of my invention are set forth in particularity in the appended claims, the invention itself however, as to both its organization and method of operation will best be understood by reference to the following description taken in connection with the drawing in which I have indicated diagrammatically several circuit organizations whereby my invention may be carried into effect.

In the drawings,

Fig. 1 is a circuit diagram of a simple transmission line embodying my invention, Fig. 2 is a circuit diagram of a preferred form of the invention, Fig. 3 is a modified arrangement for the ends of the line to secure non-reflection, Fig. 4 is another modification for a line end, Fig. 5 is a graphic representation of the guiding system.

The simple way to build an electric transmission line to secure waves of illumination would be along the lines shown in Fig. 1. At the left end of the figure are shown a source of alternating current F and a battery V connected in series, the battery voltage being such that when the alternating voltage is maximum in one direction it approximately neutralizes the battery voltage. Thus an electric bulb B energized by the combination of the two voltages will light up only once per cycle.

If, now, the inductances L and capacities C are properly chosen, as well as the number of sections per mile of the line, the electric bulbs B will light up one after the other at each cycle, forming waves of illumination that travel along the roadway at the speed desired for vehicular traffic, and with a separation between points of maximum illumination that is equal to the separation desired between vehicles. A terminating resistance R of proper value at the far end of the line prevents reflection of the electric waves.

However, to achieve the desired results in the simple way mentioned above, impracticably large values of L and C would be required. My invention additionally consists in an arrangement whereby the waves of illumination can be made to move as slowly as desired (including standing still), while the waves of current and voltage along the line can be moving at a very high speed, so that the values of L and C are not unwieldy.

In my preferred arrangement, an alternating current source $F_1$, $F_2$, is inserted at each end of the line, as shown in Fig. 2. The sources are of different frequency, and resistances $R_1$, $R_2$, are inserted, in series respectively with each of the sources, suitably chosen to prevent reflection of the current or voltage waves coming from the other end of the line. In place of ordinary incandescent electric bulbs in series in the line, I have shown the more efficient glow lamps G which produce illumination by virtue of a discharge of electricity through certain gases, and I have placed these across the circuit instead of in series. I have also shown half of the inductance L of each section in the lower part of the network for the sake of symmetry.

The actions taking place in the structure of Fig. 2, and determining the wave phenomena are of such a nature that they make it desirable to use mathematical formulæ, particularly as the latter are useful in laying down rules of design whereby anyone, skilled in the art, may construct in any proportion the constants of the circuit disclosed.

Let the frequency of $e_1$ be $F_1$, and that of $e_2$ be $F_2$. Also, let $e_1$ be approximately equal to $e_2$ in magnitude, so that where the waves from the two sources interfere, the resultant will be too small to produce any light in the bulbs G. At any given point, the current or voltage is simply the sum of two practically equal components of different frequencies. When the two components are in phase, the result is large and the bulb will light. When out of phase, they neutralize each other and the bulb does not light.

Thus, the frequency with which any given bulb lights is $F_1 - F_2$. As each vehicle A is supposed to pass a given bulb each time it lights, this frequency $F_1 - F_2$ will be called the "vehicular frequency," (see Fig. 5).

Next, it is necessary to calculate the number of sections of line between successive bulbs which are at maximum brightness at the same instant. Consider the wave due to $e_1$. Elementary theory shows that its phase is shifted at each section of the line by the angle whose cosine is $$1 - \frac{LC}{2}(2\pi F_1)^2.$$

Likewise the wave due to $e_2$ has its phase shifted by the angle whose cosine is $$1 - \frac{LC}{2}(2\pi F_2)^2$$

per section, but the shift is in the opposite direction as the waves are travelling in opposite directions.

Hence, the relative shift of phase per section between these two waves is the sum of these two angles. Now, between bulbs which are maximum in brightness at the same instant, the relative difference of phase is $2\pi$. Therefore, the number of sections between maxima of illumination is $$\frac{2\pi}{\cos^{-1}\left(1-\frac{LC}{2}(2\pi F_1)^2\right) + \cos^{-1}\left(1-\frac{LC}{2}(2\pi F_2)^2\right)}.$$

Thus in building the line, this number of sections should be used in the distance desired as space between vehicles.

With the above formulæ, it is easy to design a line that will give any desired speed and wave length to the waves of illumination. For example, as in Fig. 5, suppose that it is desired to have automobiles A travel through the tunnel at a speed of 15 miles an hour, one automobile every 22 feet. This means that one auto will pass per second, so that $F_1 - F_2 = 1$. Next, choose the number of electric bulbs per "wave" of electric light arbitrarily, say 6. (The number of sections is preferably the same as the number of bulbs.)

Then, we have $$6 = \frac{2\pi}{\cos^{-1}\left(1-\frac{LC}{2}(2\pi F_1)^2\right) + \cos^{-1}\left(1-\frac{LC}{2}(2\pi F_2)^2\right)}.$$

From this equation, and the equation $F_1 - F_2 = 1$, it is possible to determine the required values of $F_1$ and $F_2$ for a given value of LC, or else, to determine the required value of LC for given possible values of $F_1$ and $F_2$. Let us take $LC = 10^{-8}$ where L is in henrys and C in farads, and determine $F_1$ and $F_2$.

Obviously, there exists a value of F intermediate between $F_1$ and $F_2$ (call it $F_i$) for which $$2\cos^{-1}\left(1 - \frac{LC}{2}(2\pi F_i)^2\right) =$$

$$\cos^{-1}\left(1 - \frac{LC}{2}(2\pi F_1)^2\right) + \cos^{-1}\left(1 - \frac{LC}{2}(2\pi F_2)^2\right).$$

Hence $$6 = \frac{2\pi}{2\cos^{-1}\left(1 - \frac{LC}{2}(2\pi F_i)^2\right)},$$

whence $$2\pi F_i = \sqrt{2 - \sqrt{3}} \times 10^4.$$

or $F_i =$ about $826\sim$. Hence, for a sufficiently close approximation we can take $F_1 = 826\tfrac{1}{2}$ and $F_2 = 825\tfrac{1}{2}$.

In actual construction, it is well to keep $$\frac{L}{C}$$

as large as possible for a given value of LC so as to minimize attenuation along the line due to the absorption of energy by the bulbs if these are of the incandescent type in series with the line. In general, the attenuation should be kept reasonably small, so that the voltage waves going in opposite directions will be nearly enough to be equal in strength at all points on the line, so that when they are out of phase with each other the light will go out. The constant difference in frequency between generators is readily obtained by difference in gear ratio between the generators and synchronous motors driving them or by various other methods. The line is, however, preferably run up the tunnel in one direction and then turned and brought back along the other side of the tunnel so as to guide traffic in both directions. This brings the ends of the line together so that generators can be actually geared together with gearing that insures constant difference of frequency.

So far it has been assumed that the line is composed of lumped inductances and capacities with plain wire connecting links of proper length to bring about the desired spacing between vehicles. It is also possible however to use a line of distributed capacity and inductance. The mathematics of this line is too well known for repetition. It is only necessary to note that the current at any point is given by $i_1 + i_2$ where $i_1 \alpha e_1 \cos(2\pi F_1 t - b_1 x)$ and $i_2 \alpha e_2 \cos(2\pi F_2 t + b_2 x)$.

In these expressions $x$ is a distance along the line, and $b_1$ and $b_2$ are the amounts of phase shift of each wave per unit length of line. The rate of heating of the line (which determines the brightness of lights energized thereby) is proportional to the square of the total current. Squaring $i_1 + i_2$ and reducing we get:

rate of heating =

$$\frac{e_1^2}{2} + \frac{e_2^2}{2} + e_1 e_2 \cos\left(2\pi(F_1 - F_2)t - (b_1 + b_2)x\right)$$

plus terms whose frequencies are so high that even if the bulbs are so free of thermal capacity as to give light fluctuating in accordance with them, the eye would not see such fluctuations.

The terms shown above represent a wave of frequency $F_1 - F_2$ and phase which changes by $b_1 + b_2$ per unit length of line. Hence the generator frequencies must differ by the desired "vehicular" frequency, and the generator frequencies must be approximately such that the waves they send out have wave lengths twice as long as the desired separation between vehicles.

In order to render the ends of the line non-reflecting, the generators should be coupled in such a way that the terminations thereof are approximately pure resistances. In Fig. 3, there is shown a method of arranging the end of the line which comprises inserting a choke in series with the generator $F_1$ on either side thereof, and connecting a proper terminating resistance $R_3$ across the chokes for waves arriving from the other end of the line (not shown).

Fig. 4 involves a modified arrangement for accomplishing the result in Fig. 3 which comprises connecting a terminating resistance $R_4$ across the ends of the conductors connected to the generator $F_2$. The conductor ends are inductively coupled, as at $P_1$ and $P_2$, to the source of $F_1$. In this arrangement, $R_4$ prevents the presence of any appreciable induced current from $F_2$ in the circuit $F_1$.

I have graphically shown the relations existing between the vehicles, roadway, and wave of illumination in my system in Fig. 5. As stated above, the vehicles $A_1$, $A_2$ etc., are maintained 22 feet apart, for example, while on the roadway, and kept travelling at a speed D of 15 miles per hour in the direction of the arrow. The symbols $M_1$, $M_2$ etc., designate the fact that the bulbs $G_1$, $G_2$ etc., are at maximum brightness, the intervening bulbs G' being extinguished; it being understood that bulbs G'' which are dim are situated between each bulb of maximum brightness and each extinguished bulb G'. The frequency of the "wave of illumination" is, of course, equal to $(F_1 - F_2)$. Hence, the driver of a vehicle A need only keep up with the bright bulbs to ensure proper spacing and speed while passing along the roadway.

It is to be understood that the bulbs of maximum brightness may be designed to give a similar color which is different from the color of intervening bulbs. Thus, the operator of the vehicle would be constantly trying to keep up with a colored glow tube ahead of him, and the same result, as above, would be secured. It is also obvious, that waves of informative signals, other than visual, may be used in place of bulbs, and that the system may be applied to any type of passage, other than a tunnel.

While I have indicated and described only one system for carrying my invention into effect, it will be apparent to one skilled in the art that my invention is by no means limited to the particular organizations shown and described, but that many modifications in the circuit arrangements, as well as in the apparatus employed, may be made without departing from the scope of my invention as set forth in the appended claims.

What I claim is:

1. An illumination method which consists in generating an alternating current at each end of an electric transmission line including a plurality of equally spaced illuminating means, both of the currents being substantially equal in magnitude but of different frequencies, transmitting the currents through the line, and maintaining the electrical characteristics of the line so that at any given illuminating means on the line the effective current is the sum of the two current strengths but has a frequency equal to the difference of the two current frequencies whereby waves of illumination are produced along the line travelling with a frequency equal to that of the effective current frequency.

2. An illumination circuit comprising an electric transmission line, a plurality of equally spaced illuminating means along the line, means at each end of the line to generate an alternating current, the alternating currents being approximately equal in strength but of different frequencies, and one or more sections, including inductances and capacities, of predetermined values in the line, each illuminating means attaining maximum brilliance at a frequency equal to the difference of the frequencies of the two alternating currents.

3. An illumination circuit, as defined in claim 2, there being a resistance at each end of the line to prevent reflection of the electric waves, and each of the illuminating means being a glow lamp connected across the line.

4. In combination, an electrical transmission line including distributed reactances of predetermined values, an alternating current source connected to each end of the line, a plurality of equi-distant illuminating means connected along the line, impedances connected at each end of the line in such a manner that the line terminals are substantially pure resistances whereby reflection of electrical waves is prevented, the alternating currents being of approximately equal magnitude, but of frequencies such that waves of illumination will travel along the line with a frequency equal to the difference of the alternating current frequencies.

5. A method for guiding traffic composed of independent, moving units, along a predetermined path in such a manner that the units may space themselves a constant distance apart and may travel at the same speed, which consists in generating pulsating electrical energy of a predetermined voltage, transmitting the energy through a transmission path positioned along said traffic path, periodically neutralizing the effect of the energy at predetermined points of said transmission path and reinforcing the energy effect at other points, at a frequency equal to the desired speed of said units and causing indicators to indicate points of energy reinforcement.

6. A method for guiding traffic composed of independent, moving units, along a predetermined path in such a manner that the units may space themselves a constant distance apart and may travel at the same speed, which consists in generating pulsating electrical energy of a predetermined voltage, transmitting the energy through a transmission path positioned along said traffic path, generating additional energy of a voltage approximately equal to that of the pulsating energy, transmitting the additional energy through the transmission path in such a manner that the energy voltages are neutralized and reinforced at predetermined points of the said transmission path at a frequency equal to the desired speed of said units, and causing indicators to indicate points of voltage reinforcement.

7. In combination, in a traffic system, an electric transmission line including one, or more, sections containing distributed reactances of predetermined values, a source of pulsating current at each end of the line, a plurality of equally spaced illumination means associated with the line, said pulsating currents being of such relative magnitudes and different frequencies that waves of illumination travel along the line with a frequency equal to the difference of the said frequencies.

8. In combination, in a traffic system, an electric transmission line including one, or more, sections containing distributed reactances of predetermined values, a source of pulsating current at each end of the line, a plurality of equally spaced illumination means associated with the line, said pulsating currents being of such relative magnitudes and different frequencies that waves of illumination travel along the line with a frequency equal to the difference of said frequencies and additional means at one end of said line to prevent reflection of electric pulsations.

9. In combination, in a traffic system, an electric transmission line including one, or more, sections containing distributed reactances of predetermined values, a source of pulsating current at each end of the line, a plurality of equally spaced illumination means associated with the line, said pulsating currents being of such relative magnitudes and different frequencies that waves of illumination travel along the line with a frequency equal to the difference of the said frequencies and impedances at each terminal of the said line to maintain the same non-reflecting.

10. In combination, in a traffic system, an electric transmission line including one, or more, sections containing distributed reactances of predetermined values, a source of pulsating current at each end of the line, a plurality of equally spaced illumination means associated with the line, said pulsating currents being of such relative magnitudes and different frequencies that waves of illumination travel along the line with a frequency equal to the difference of the said frequencies and each of said illumination means being a glow discharge device.

11. In combination, in a traffic system, an electric transmission line including one, or more, sections containing distributed reactances of predetermined values, a source of pulsating current at each end of the line, a plurality of equally spaced illumination means associated with the line, said pulsating currents being of such relative magnitudes and different frequencies that waves of illumination travel along the line with a frequency equal to the difference of the said frequencies, the reactances in each section comprising at least one inductance and capacity in series.

12. In combination, in a traffic system, an electric transmission line including one, or more, sections containing distributed reactances of predetermined values, a source of pulsating current at each end of the line, a plurality of equally spaced illumination means associated with the line, said pulsating currents being of such relative magnitudes and different frequencies that waves of illumination travel along the line with a frequency equal to the difference of the said frequencies, the reactances in each section including at least an inductance and capacity, each illumination means being connected to the latter.

13. In combination, an electric transmission line including distributed reactances of predetermined values, a source of alternating current connected to the line, a second source of current connected to the line, a plurality of spaced illumination means connected along the line, the relative magnitudes of the two sources and the frequency of the said first source being so chosen that waves of illumination are produced along the line.

14. In combination, an electric transmission line including distributed reactances of predetermined values, a source of alternating current connected to the line, a second source of current connected to the line, a plurality of spaced illumination means connected along the line, the relative magnitudes of the two sources and the frequency of the said first source being so chosen that waves of illumination are produced along the line, said first source being connected to one end of the line, and an impedance being connected at the opposite end to prevent reflection of electric waves.

15. In combination, an electric transmission line including distributed reactances of predetermined values, a source of alternating current connected to the line, a second source of current connected to the line, a plurality of spaced illumination means connected along the line, the relative magnitudes of the two sources and the frequency of the said first source being so chosen that waves of illumination are produced along the line, said second source being connected in series with said first source.

16. In combination, an electric transmission line including distributed reactances of predetermined values, a source of alternating current connected to the line, a second source of current connected to the line, a plurality of spaced illumination means connected along the line, the relative magnitudes of the two sources and the frequency of the said first source being so chosen that waves of illumination are produced along the line said both sources being connected to one end of the line.

17. In combination, an electric transmission line including distributed reactances of predetermined values, a source of alternating current connected to the line, a second source of current connected to the line, a plurality of spaced illumination means connected along the line, the relative magnitudes of the two sources and the frequency of the said first source being so chosen that waves of illumination are produced along the line one of said sources being connected to one end of the line, and the other source being connected to the opposite end, and a terminating impedance connected at each end of the line.

18. In combination, an electric transmission line including distributed reactances of predetermined values, a source of alternating current connected to the line, a second source of current connected to the line, a plurality of spaced illumination means connected along the line, the relative magnitudes of the two sources and the frequency of the said first source being so chosen that waves of illumination are produced along the line, said second current source being an alternating current source and having a frequency different from that of the said first source.

19. In combination, an electric transmission line including distributed reactances of predetermined values, a source of alternating current connected to the line, a second source of current connected to the line, a plurality of spaced illumination means connected along the line, the relative magnitudes of the two sources and the frequency of the said first source being so chosen that waves of illumination are produced along the line, at least one of said sources being independent of said line, but connected thereto by an inductive coupling.

WALTER van B. ROBERTS.